United States Patent
Jung

(10) Patent No.: US 10,027,139 B2
(45) Date of Patent: Jul. 17, 2018

(54) BATTERY MODULE

(71) Applicant: Samsung SDI Co., Ltd., Yongin-si, Gyeonggi-do (KR)

(72) Inventor: Heesung Jung, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 98 days.

(21) Appl. No.: 15/139,091

(22) Filed: Apr. 26, 2016

(65) Prior Publication Data

US 2016/0315484 A1 Oct. 27, 2016

(30) Foreign Application Priority Data

Apr. 27, 2015 (KR) .................. 10-2015-0059106

(51) Int. Cl.
*H02J 7/00* (2006.01)
*H01M 10/42* (2006.01)

(52) U.S. Cl.
CPC .......... *H02J 7/0021* (2013.01); *H02J 7/0029* (2013.01); *H02J 7/0042* (2013.01); *H02J 7/0047* (2013.01); *H01M 2010/4271* (2013.01); *Y02T 10/7055* (2013.01)

(58) Field of Classification Search
CPC ....... H02J 7/0021; H02J 7/0042; H01M 10/46
USPC ................... 320/106, 112; 429/92
See application file for complete search history.

(56) References Cited

U.S. PATENT DOCUMENTS

| 7,085,112 | B2* | 8/2006 | Wilk | H01G 9/008 361/15 |
| 7,843,165 | B2* | 11/2010 | Sakaue | H01M 2/1022 320/106 |
| 8,182,937 | B2* | 5/2012 | Davis | H01M 6/5044 116/210 |
| 2007/0002518 | A1* | 1/2007 | Wilk | H01G 9/008 361/272 |
| 2008/0291623 | A1* | 11/2008 | Genin | H01M 2/0285 361/688 |
| 2013/0049649 | A1 | 2/2013 | Park et al. | |
| 2013/0171477 | A1 | 7/2013 | Park | |

FOREIGN PATENT DOCUMENTS

| JP | 11-297287 A | 10/1999 |
| JP | 2013-246941 A | 12/2013 |
| KR | 10-2013-0022273 A | 3/2013 |
| KR | 10-2013-0080212 A | 7/2013 |

* cited by examiner

*Primary Examiner* — M'Baye Diao
(74) *Attorney, Agent, or Firm* — Knobbe Martens Olson & Bear LLP

(57) ABSTRACT

A battery module is disclosed. In one aspect, the battery module includes a battery management system configured to control charge and discharge operations of a battery pack, and a conductor configured to form charge and discharge current paths of the battery pack. The battery module also includes a relay electrically connected to the conductor and configured to selectively block the charge and discharge current paths and a support plate supporting the battery management system, the conductor and the relay.

17 Claims, 5 Drawing Sheets

BATTERY MODULE

CROSS-REFERENCE TO RELATED APPLICATION

This application claims the benefit of Korean Patent Application No. 10-2015-0059106, filed on Apr. 27, 2015, in the Korean Intellectual Property Office, the disclosure of which is incorporated herein in its entirety by reference.

BACKGROUND

Field

The described technology generally relates to a battery module.

Description of the Related Technology

Generally, unlike a primary battery, a secondary battery can be charged and discharged multiple times. A secondary battery (or rechargeable battery) can be used as an energy source of a mobile device, an electric car, a hybrid car, an electric bicycle, an uninterruptible power supply apparatus, or the like. A secondary battery is used in a single battery type or a battery module type, according to a type of an applied external device. In the case of the battery module type, a plurality of batteries are electrically connected to each other in one unit.

A compact mobile device, e.g., a cellular phone, can be operated with the power and capacity of a single battery cell for a predetermined time. However, where long-time driving and high-power driving are required in an electric vehicle or hybrid vehicle which consumes a large amount of power, a high-capacity battery module is configured by electrically connecting a number of battery cells in order to increase power and capacity. The output voltage or output current of the battery module increases according to the number of battery cells built in the battery module.

SUMMARY OF CERTAIN INVENTIVE ASPECTS

One inventive aspect relates to a battery module in which a plurality of protection circuit components are modularized as a single unit component.

Another aspect is a battery module that includes a battery management system controlling charge and discharge operations of a battery pack; a conductive member forming charge and discharge current paths of the battery pack; a relay electrically connected to the conductive member and selectively blocking the charge and discharge current paths; and a support plate supporting the battery management system, the conductive member and the relay.

In some embodiments, the battery management system and the relay are placed at different positions and directly supported by the support plate, and the conductive member is indirectly supported by the support plate through the relay, wherein the relay is connected to one end portion of the conductive member.

In some embodiments, the battery management system and the relay are screw-coupled to the support plate, and the conductive member is screw-coupled to the relay.

In some embodiments, input current flows through one side of the conductive member while output current flows through the other side of the conductive member according to charge and discharge operations, and the conductive member includes a first conductive member and a second conductive member, wherein one end of each of the first and second conductive members is connected to the relay.

In some embodiments, a hole sensor inserted around the conductive member measures charge and discharge current.

In some embodiments, the hole sensor is supported by the support plate through the conductive member.

In some embodiments, the support plate includes a first support plate that supports the battery management system; and a second support plate that extends from the first support plate and supports the conductive member and the relay.

In some embodiments, the battery management system includes a circuit substrate and a plurality of circuit devices supported on the circuit substrate, and the first support plate supports an entirety of the circuit substrate.

In some embodiments, the battery management system is directly supported on the first support plate, the relay is directly supported on the second support plate, and the conductive member is indirectly supported by the second support plate through the relay, wherein the relay is connected to one end of the conductive member.

In some embodiments, the battery module further includes a buzzer that is directly supported by the second support plate, and is connected to the battery management system to provide an alarm, wherein the battery management system is indirectly supported by the second support plate through the buzzer.

In some embodiments, the buzzer is placed between the battery management system and the second support plate.

In some embodiments, the buzzer and the relay are coupled to the second support plate at positions adjacent to each other.

In some embodiments, the first and second support plates are placed in different planes.

In some embodiments, the first support plate is placed in a horizontal direction, and the second support plate is placed in a vertical direction perpendicular to the horizontal direction.

In some embodiments, the support plate is formed of a metal material.

Another aspect is a battery module comprising: a battery management system configured to control charge and discharge operations of a battery pack; a conductor configured to form charge and discharge current paths of the battery pack; a relay electrically connected to the conductor and configured to selectively block the charge and discharge current paths; and a support plate supporting the battery management system, the conductor and the relay.

In the above battery module, the battery management system and the relay are placed at different positions and directly supported by the support plate, and wherein the conductor is indirectly supported by the support plate through the relay, and wherein the relay is connected to one end portion of the conductor. In the above battery module, the battery management system and the relay are screw-coupled to the support plate, and wherein the conductor is screw-coupled to the relay. In the above battery module, the conductor is configured to control input current to flow through one side of the conductor and control output current to flow through the other side of the conductor according to charge and discharge operations, wherein the conductor comprises a first conductor and a second conductor, and wherein one end of each of the first and second conductors is connected to the relay.

The above battery module further comprises a hole sensor inserted around the conductor and configured to measure charge and discharge current. In the above battery module, the hole sensor is supported by the support plate through the conductor. In the above battery module, the support plate comprises a first support plate that supports the battery management system; and a second support plate that extends from the first support plate and supports the conductor and the relay. In the above battery module, the battery management system comprises a circuit substrate and a plurality of circuit devices supported on the circuit substrate, and wherein the first support plate supports an entirety of the circuit substrate. In the above battery module, the battery management system is directly supported on the first support plate, wherein the relay is directly supported on the second support plate, wherein the conductor is indirectly supported by the second support plate through the relay, and wherein the relay is connected to one end of the conductor.

The above battery module further comprises a buzzer directly supported by the second support plate, and connected to the battery management system to provide an alarm, wherein the battery management system is indirectly supported by the second support plate through the buzzer. In the above battery module, the buzzer is placed between the battery management system and the second support plate. In the above battery module, the buzzer and the relay are coupled to the second support plate at positions adjacent to each other. In the above battery module, the first and second support plates are placed on different planes. In the above battery module, the first support plate is placed in a horizontal direction, and wherein the second support plate is placed in a vertical direction substantially perpendicular to the horizontal direction. In the above battery module, the support plate is formed of a metal material.

Another aspect is a battery module comprising: a battery management system configured to control charge and discharge operations of a battery pack; a conductor configured to form charge and discharge current paths of the battery pack; a relay electrically connected to the conductor and selectively block the charge and discharge current paths; and a support plate supporting at least two of the battery management system, the conductor and the relay.

In the above battery module, the support plate comprises: a first support plate supporting the battery management system and extending in a first direction; and a second support plate extending from the first support plate and supporting the conductor, wherein the second support plate extends in a second direction crossing the first direction. In the above battery module, the second direction is substantially perpendicular to the first direction. In the above battery module, the battery management system and the relay are placed at different positions and directly supported by the support plate, wherein the conductor is indirectly supported by the support plate through the relay, and wherein the relay is connected to one end portion of the conductor. In the above battery module, the battery management system and the relay are screw-coupled to the support plate, and wherein the conductor is screw-coupled to the relay.

BRIEF DESCRIPTION OF THE DRAWINGS

These and/or other aspects will become apparent and more readily appreciated from the following description of the exemplary embodiments, taken in conjunction with the accompanying drawings.

DETAILED DESCRIPTION OF CERTAIN INVENTIVE EMBODIMENTS

Hereinafter, exemplary embodiments will be described in detail with reference to drawings attached to the present specification.

Although not illustrated in drawings, a battery module according to embodiments can include at least one or more slave packs, and a master pack that is electrically connected to the salve packs in order to control charge and discharge operations of the slave packs.

The slave pack may be a battery pack that can perform charge and discharge operations, for example, including at least two or more battery cells electrically connected to each other. The term "slave pack" or "battery pack" used herein may refer a secondary battery that can perform charge and discharge operations, and the two terms be used alternatively.

The battery module may include one or more slave packs. For example, the battery module includes at least two or more slave packs which may be electrically connected to each other through a bus bar. Also, the slave packs and the master pack may be electrically connected through a bus bar. For example, discharge current from the slave packs is applied through the master pack to an external load, and charge current from an external charger is applied through the master pack to the slave packs. In this disclosure, the term "substantially" includes the meanings of completely, almost completely or to any significant degree under some applications and in accordance with those skilled in the art. Moreover, "formed on" can also mean "formed over." The term "connected" includes an electrical connection.

Figure 1:
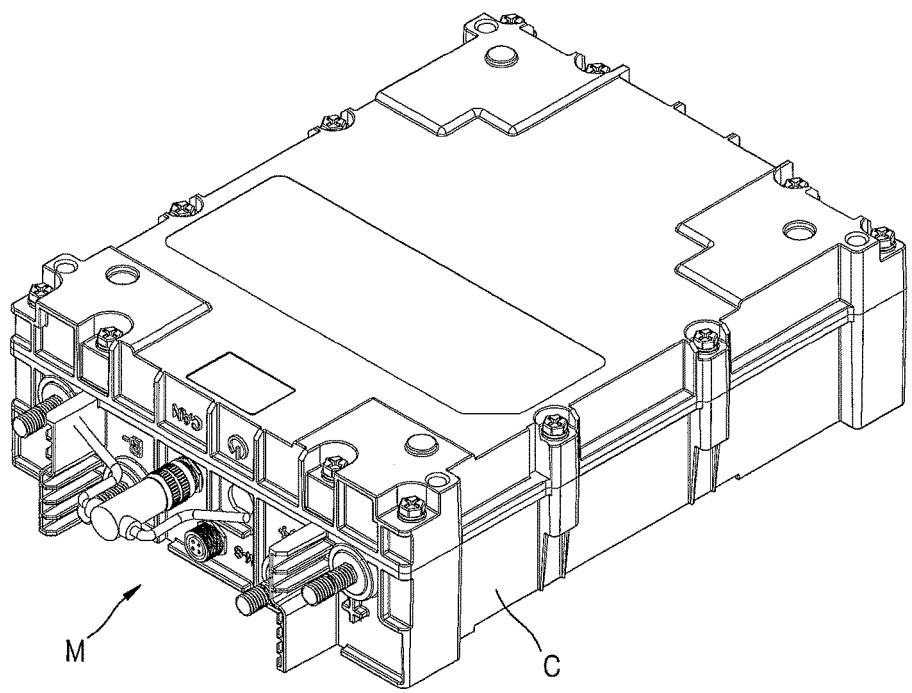
FIG. 1 illustrates a view of a master pack according to an embodiment.
Figure 2:
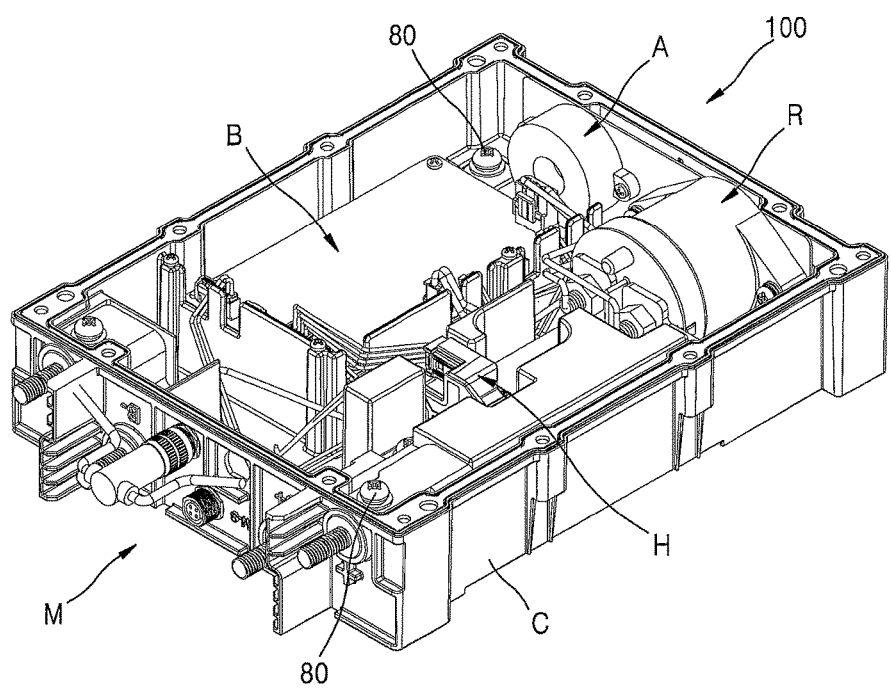
FIG. 2 illustrates an inside of the master pack of FIG. 1.

Referring to FIGS. 1 and 2, a master pack M includes a plurality of protection circuit components placed within a pack case C. The protection circuit components can include circuit components configured to control charge and discharge operations of a slave pack, i.e., battery pack (not shown). As described later, the protection circuit components may be supported by a support plate 10 to thus form a protection circuit module 100 that is modularized as a unit component (see FIG. 3).

The protection circuit components may include a battery management system B configured to control the charge and discharge operations of the battery pack (slave pack), a conductive member (or conductor) 50 configured to form charge and discharge current paths, and a relay R and a hole sensor H formed on the charge and discharge current paths. The battery management system B may generate a control signal for controlling the charge and discharge operations of the battery pack (slave pack). For example, the battery management system B performs a protection operation to stop the charge and discharge operations by controlling the relay R in an abnormal operating condition such as overcharge, over-discharge, over-current, and overheat. Furthermore, the battery management system B may collect condition information of the battery pack (slave pack) and, based on the collected condition information, determine whether the battery pack (slave pack) is malfunctioning and then perform a protection operation, for example, the termination of charge and discharge operations, based on the determination.

Figure 3:
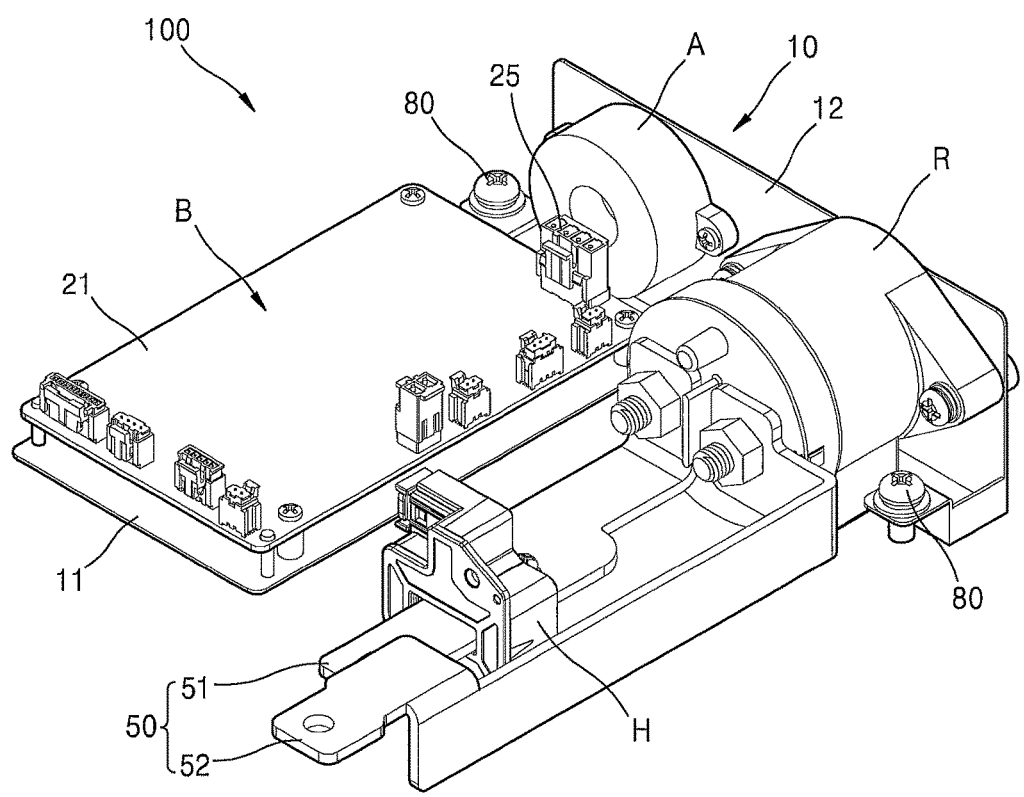
FIG. 3 illustrates a view of a protection circuit module of FIG. 2.
Figure 4:
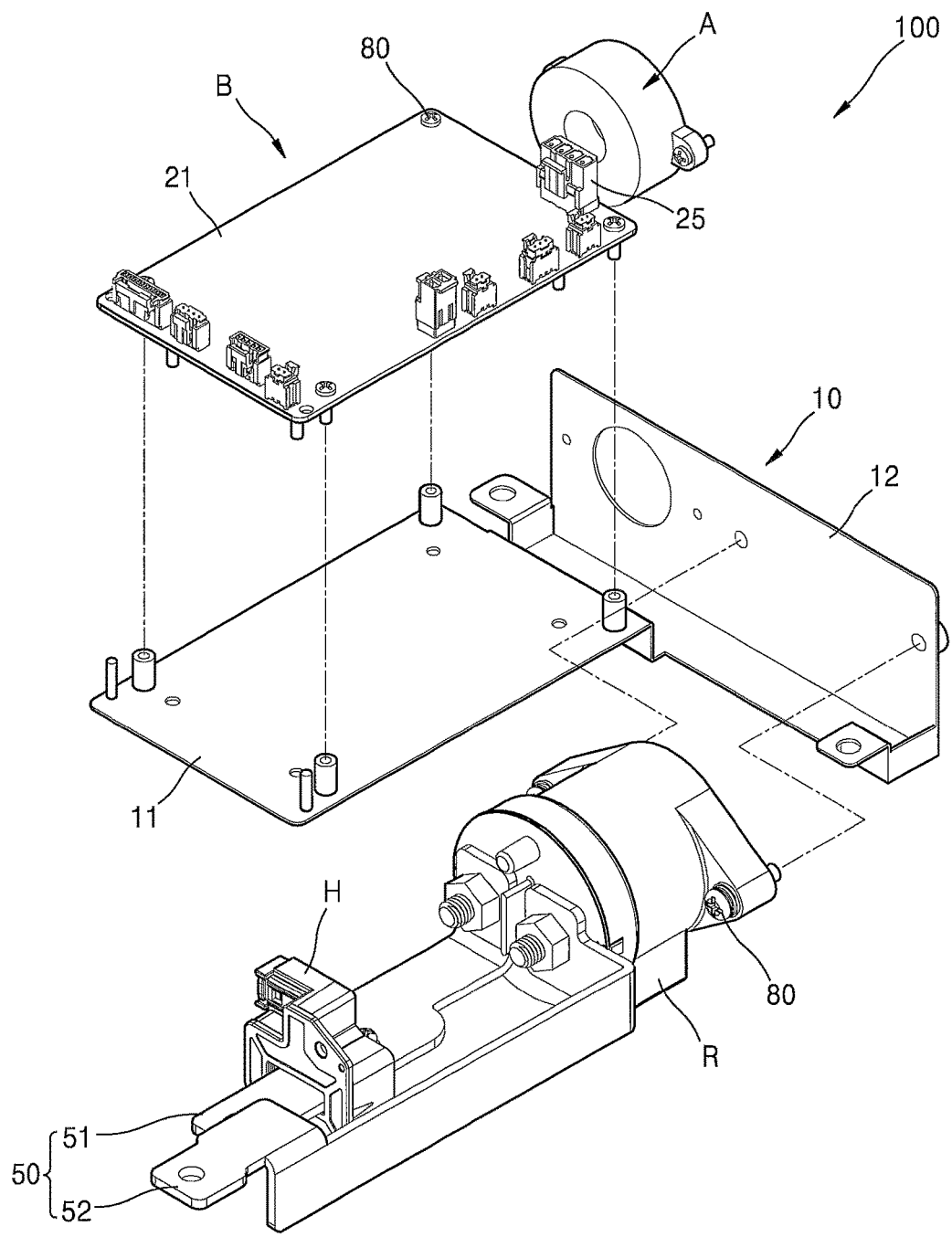
FIG. 4 illustrates an exploded perspective view of the protection circuit module of FIG. 3.
Figure 5:
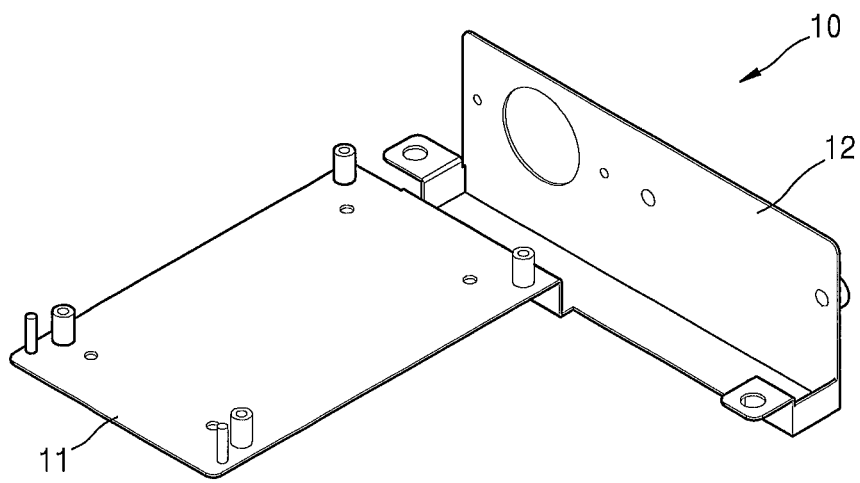
FIG. 5 illustrates a view of a support plate of FIG. 4.

Referring to FIG. 3, the battery management system B includes a circuit substrate 21 and a plurality of circuit devices 25 placed on the circuit substrate 21. As described later, the battery management system B may be supported on a first support plate 11.

The hole sensor H may be formed on the conductive member 50 to generate a detection signal of charge and discharge current. The detection signal generated by the hole sensor H may be transmitted to the battery management system B, and the relay R may be turned off according to a determination by the battery management system B in response to an over-current condition.

The relay R may be formed on the conductive member 50 and be turned on or off to connect or disconnect the charge and discharge current paths. The relay R may be electrically connected to an end of a first conductive member (or a first conductor) 51 and an end of a second conductive member (or a second conductor) 52. Depending on a direction of charge and discharge current, current supplied through the first conductive member 51 may pass through the relay R to flow to the second conductive member 52 whereas a current supplied through the second conductive member 52 may pass through the relay R to flow to the first conductive member 51. Charge and discharge current paths may be connected or disconnected according to turn-on/turn-off operations of the relay R placed between the first and second conductive members 51 and 52 for charge and discharge current flowing through the conductive members 51 and 52. The hole sensor H may be inserted around one of the first and second conductive members 51 and 52, for example, the first conductive member 51.

In an exemplary embodiment, the battery management system B, the relay R, and the conductive member 50 may be directly or indirectly fixed by the support plate 10. The support plate 10 may provide a place where protection circuit components are installed and support a plurality of protection circuit components all together so as to modularize the protection circuit components as a single component.

In addition to serving as a place where the protection circuit components may be installed, the support plate 10 may also serve as a heat dissipation plate configured to dissipate heat from the protection circuit components. For example, the support plate 10 may be formed of a metal material which has a good thermal conductivity. For example, the support plate 10 is formed of a stainless steel (SUS) material.

The support plate 10 may include the first support plate 11 supporting the battery management system B, and a second support plate 12 extending from the first support plate 11. The second support plate 12 may be placed in a different direction (e.g., crossing direction or perpendicular direction) from a direction of the first support plate 11. The circuit substrate 21 of the battery management system B may be placed on the first support plate 11. The battery management system B can be connected to the first support plate 11 via, for example, screw-coupling, and be directly supported on the first support plate 11. The battery management system B can also be connected to the first support plate 11 via press-fit, groove-protrusion, other fastening mechanisms or welding. The first support plate 11 may be formed to have a large area sufficient to cover the entirety of the battery management system B to support the entirety of the battery management system B.

The first and second support plates 11 and 12 can be placed in different planes. In an exemplary embodiment, when the first support plate 11 is placed in a horizontal direction, the second support plate 12 may be placed in a vertical direction substantially perpendicular to the horizontal direction.

The second support plate 12 may support the conductive member 50, and the relay R and the hole sensor H formed on the charge and discharge current paths. The second support plate 12 may directly support the relay R and may indirectly support the conductive member 50 through the relay R by connecting the relay R and one end portion of the conductive member 50. In addition, the hole sensor H inserted around the conductive member 50 may be indirectly supported by the second support plate 12 through the conductive member 50 and the relay R.

As described later, the second support plate 12 may also support a buzzer A connected to the battery management system B, in addition to the relay R. Here, the relay R and the buzzer A may be coupled to the second support plate 12 at positions adjacent to each other and be directly supported by the second support plate 12. For example, the relay R and the buzzer A may be screw-coupled to the second support plate 12.

The battery management system B may be supported by the first support plate 11 and may also be supported by the second support plate 12. For example, the battery management system B can be directly supported by the first support plate 11, and can also be indirectly supported by the second support plate 12. The buzzer A may be placed between the second support plate 12 and the battery management system B. Here, the battery management system B may be indirectly supported by the second support plate 12 through the buzzer A. The buzzer A may be electrically connected to the battery management system B. For example, the buzzer A may be coupled to the circuit substrate 21 of the battery management system B or a circuit device 25 on the circuit substrate 21.

The buzzer A may provide an audio alarm signal. For example, the buzzer A may provide an alarm signal when the battery pack (slave pack) malfunctions, and may provide a prior alarm to prevent an accident such as a battery explosion. For example, the buzzer A may be controlled by the battery management system B that is electrically connected to the buzzer A and may provide an alarm signal for a user to take immediate action, according to a control signal of the battery management system B.

In an exemplary embodiment, the battery management system B, the relay R, the conductive member 50, and the hole sensor H are supported together by the support plate 10, and thus, the protection circuit components may be modularized. Hereinafter, more detailed descriptions thereof will be provided.

Compared to exemplary embodiments, in conventional assembly processes (not necessarily prior art), each of the battery management system B, the relay R, the conductive member 50, and the hole sensor H is independently assembled. For example, the protection circuit components are separately and independently assembled in the pack case C. Here, since separate and independent assembly structures (e.g., a screw-coupling structure) specific to each component are required by the protection circuit components, physical space within the pack case C becomes constrained, which results in decline in efficiency and productivity of an assembly process. Also, a heat dissipator configured to dissipate heat from a heating component such as the battery management system B is not prepared, and external noise is not blocked.

In an exemplary embodiment, the protection circuit components may be modularized by the support plate 10, and thus the protection circuit components may be assembled as a single unit component. For example, the protection circuit components is assembled to the support plate 10 to form the protection circuit module 100 as a single component, and then the protection circuit module 100 formed in the above process may be assembled within the pack case C by using a single assembly process, thereby forming a master pack M.

In addition, the protection circuit components may dissipate heat through the support plate 10 serving also as a heat dissipation plate. This can improve heat dissipation of the battery management system B and thus provide an optimal driving condition.

The support plate 10 may be formed of a metal material to thus electromagnetically shield the protection circuit components. For example, the support plate 10 shields the battery management system B from external noise to prevent malfunctions caused by the external noise.

The protection circuit module 100 formed by assembling the protection circuit components to the support plate 10 may be installed in the pack case C. In some embodiments, the protection circuit module 100 is screw-coupled within the pack case C. For example, the protection circuit module 100 is fixed to the pack case C by screw members 80 which pass through a plurality of holes of the protection circuit module 100 and couple the protection circuit module 100 to the pack case C. The screw members 80 may pass through the conductive member 50 and the support plate 10 to screw-couple the protection circuit module 100 to the pack case C.

By using the protection circuit module 100 modularized as a single unit component in an assembly process, a plurality of protection circuit components may be installed in the pack case C in a single step. As a result, the number of assembly processes in the pack case C having a limited physical space may be dramatically decreased, thereby improving work efficiency and productivity, compared to a case in which the protection circuit components are separately assembled.

In an exemplary embodiment, a plurality of battery packs or slave packs are provided. For example, the battery packs (not shown) are connected to correspond to electrical output requirements. In this case, the battery packs may be electrically connected by a bus bar (not shown), and charge and discharge operations may be controlled by a master pack with the battery packs as slave packs. Although not illustrated in drawings, a high current path for carrying charge and discharge current and a low current path for transmitting status information of the battery packs (slave pack) may be formed between the battery packs (slave pack) and the master pack.

In various embodiments, a plurality of protection circuit components are modularized by a support plate and thus, the protection circuit components may be assembled as a single unit component. For example, the protection circuit components are assembled on a support plate to form a protection circuit module in which the protection circuit components are integrated as a single unit. Then, the protection circuit module manufactured above may be assembled in a pack case in a single assembly process to manufacture a master pack.

Furthermore, the protection circuit components can dissipate heat through a support plate serving also as a heat dissipation plate. Thus, heat dissipation of a battery management system may be improved and an optimal driving condition may be provided. The support plate may be formed of a metal material and electromagnetically shield the protection circuit components.

It should be understood that exemplary embodiments described herein should be considered in a descriptive sense only and not for purposes of limitation. While the inventive technology has been described with reference to the figures, it will be understood by those of ordinary skill in the art that various changes in form and details may be made therein without departing from the spirit and scope as defined by the following claims.

What is claimed is:

1. A battery module comprising:
   a battery management system configured to control charge and discharge operations of a battery pack;
   a conductor configured to form charge and discharge current paths of the battery pack;
   a relay electrically connected to the conductor and configured to selectively block the charge and discharge current paths; and
   a support plate supporting the battery management system, the conductor and the relay,
   wherein the battery management system and the relay are placed at different positions and directly supported by the support plate, wherein the conductor is indirectly supported by the support plate through the relay, wherein the relay is connected to one end portion of the conductor,
   wherein the conductor is configured to control input current to flow through one side of the conductor and control output current to flow through the other side of the conductor according to charge and discharge operations, wherein the conductor comprises a first conductor and a second conductor, and wherein one end of each of the first and second conductors is connected to the relay.

2. The battery module of claim 1, wherein the battery management system and the relay are screw-coupled to the support plate, and wherein the conductor is screw-coupled to the relay.

3. The battery module of claim 1, further comprising a hole sensor inserted around the conductor and configured to measure charge and discharge current.

4. The battery module of claim 3, wherein the hole sensor is supported by the support plate through the conductor.

5. The battery module of claim 1, wherein the support plate comprises:
   a first support plate that supports the battery management system; and
   a second support plate that extends from the first support plate and supports the conductor and the relay.

6. The battery module of claim 5, wherein the battery management system comprises a circuit substrate and a plurality of circuit devices supported on the circuit substrate, and wherein the first support plate supports an entirety of the circuit substrate.

7. The battery module of claim 5, wherein the battery management system is directly supported on the first support plate, wherein the relay is directly supported on the second support plate, wherein the conductor is indirectly supported by the second support plate through the relay, and wherein the relay is connected to one end of the conductor.

8. The battery module of claim 7, further comprising a buzzer directly supported by the second support plate, and connected to the battery management system to provide an alarm, wherein the battery management system is indirectly supported by the second support plate through the buzzer.

9. The battery module of claim 8, wherein the buzzer is placed between the battery management system and the second support plate.

10. The battery module of claim 9, wherein the buzzer and the relay are coupled to the second support plate at positions adjacent to each other.

11. The battery module of claim 5, wherein the first and second support plates are placed on different planes.

12. The battery module of claim 11, wherein the first support plate is placed in a horizontal direction, and wherein the second support plate is placed in a vertical direction substantially perpendicular to the horizontal direction.

13. The battery module of claim 1, wherein the support plate is formed of a metal material.

14. A battery module comprising:
- a battery management system configured to control charge and discharge operations of a battery pack;
- a conductor configured to form charge and discharge current paths of the battery pack;
- a relay electrically connected to the conductor and selectively block the charge and discharge current paths; and
- a support plate supporting at least two of the battery management system, the conductor and the relay,
- wherein the battery management system and the relay are placed at different positions and directly supported by the support plate, wherein the conductor is indirectly supported by the support plate through the relay, wherein the relay is connected to one end portion of the conductor,
- wherein the conductor is configured to control input current to flow through one side of the conductor and control output current to flow through the other side of the conductor according to charge and discharge operations, wherein the conductor comprises a first conductor and a second conductor, and wherein one end of each of the first and second conductors is connected to the relay.

15. The battery module of claim 14, wherein the support plate comprises:
- a first support plate supporting the battery management system and extending in a first direction; and
- a second support plate extending from the first support plate and supporting the conductor, wherein the second support plate extends in a second direction crossing the first direction.

16. The battery module of claim 15, wherein the second direction is substantially perpendicular to the first direction.

17. The battery module of claim 14, wherein the battery management system and the relay are screw-coupled to the support plate, and wherein the conductor is screw-coupled to the relay.

* * * * *